Nov. 29, 1949    G. H. HUFFERD    2,489,890

BRAKE HOSE END

Filed May 10, 1946

INVENTOR.
George H. Hufferd
BY Richey & Watts
Attorneys

Patented Nov. 29, 1949

2,489,890

UNITED STATES PATENT OFFICE 2,489,890

BRAKE HOSE END

George H. Hufferd, Shaker Heights, Ohio, assignor to The Weatherhead Company, Cleveland, Ohio, a corporation of Ohio Application May 10, 1946, Serial No. 668,681

2 Claims. (Cl. 285—84)

My invention relates to hose couplings and has for its principal object the provision of improved, easily manufactured, inexpensive, easily assembled hose ends, especially such as may be employed for hose couplings of hydraulic brakes for automotive vehicles.

Other and further objects, features and advantages of the invention will become apparent as the description proceeds.

In carrying out my invention in accordance with a preferred form thereof, I provide a tubular sleeve member having one end adapted to engage the outer surface of a hose composed of resilient material such as rubber or synthetic compound and having a reduced diameter portion at the other end inwardly or outwardly threaded for coupling with other threaded fittings. A shoulder or seat is formed at the reduced diameter portion of the tubular member against which the body insert preferably conical, is adapted to fit with sufficient precision to form a fluid-tight joint. A standpipe is joined to or integral with the body insert and arranged to project within the hose engaging portion of the tubular member to engage the bore of a hose. The tubular member is deformed inwardly for the purpose of directly or indirectly securing the body insert within the tubular member. This may be done in such a manner as to form a shoulder adjacent the body insert directly securing the body insert within the tubular member or in such a manner as to compress the hose against the standpipe so as to hold both the hose and the standpipe in position within the tubular member and thereby secure the body insert therein.

A better understanding of the invention will be afforded by the following detailed description considered in conjunction with the accompanying drawing in which Fig. 1 is a longitudinal, medial, sectional view of a hose coupling forming an embodiment of my invention;

Like reference characters are utilized throughout the drawing to designate like parts.

Figure 1:
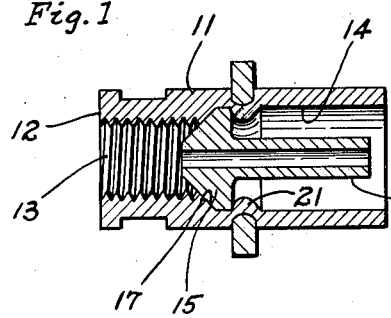

Referring to Figs. 1 to 5 of the drawing, where where it is desired to provide a hose coupling which is interiorly threaded at one end for connection with an exteriorly threaded fitting, the coupling preferably comprises a tubular member 11 having a reduced-diameter portion 12 at one end interiorly threaded to provide a screw thread 13. The other end 14 of the tubular member 11 is adapted to surround the outer surface of the end of a hose, not shown, in Figs. 1 to 5; but, indicated in Fig. 7.

A body insert 15 is provided having a standpipe 16, projecting therefrom within the hose-engaging portion 14 of the tubular member 11, adapted to engage the interior surface or bore of the hose joined with the coupling. The line of demarcation between the reduced diameter portion 12 and the remainder of the tubular member 11 is machined or otherwise formed accurately so as to serve as a seat 17 for a corresponding surface of the body insert 15 in order to provide a fluid-tight joint between the body insert 15 and the tubular member 11. Preferably, as illustrated, the seat 17 is conical in shape.

Figure 2:
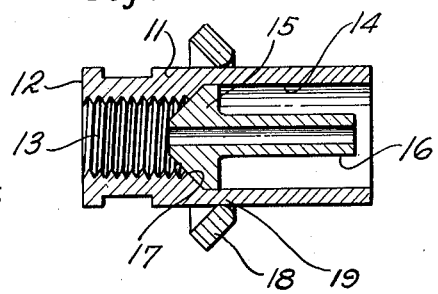
Fig. 2 is a longitudinal, sectional view corresponding to Fig. 1, illustrating the manner of crimping the tubular member to secure the parts thereof.

Suitable means are provided for securing the body insert 15 in close contact with the conical seat 17. As illustrated in Fig. 2, a conical washer 18 is provided which fits around the tubular member 11. In order to crimp the tube 11 inwardly at the intermediate portion 19 thereof, adjacent the inner edge of the body insert 15, the conical washer 18 is flattened in the position, as shown in Fig. 2. This may be done in any desired manner as by means of two relatively thick sleeves slipped over the tubular member 11 from either end and driven together so as to bring the surfaces of the washer 18 into parallel planes as illustrated in Fig. 1. This action reduces the diameter of the bore of the washer 18, deforming the walls of the tubular member 11, as shown in Fig. 1, to produce an inward annular rib 21 adjacent the body insert 15; thus, securing the body insert 15 together with the standpipe 16 within the tubular member 11.

Figure 3:
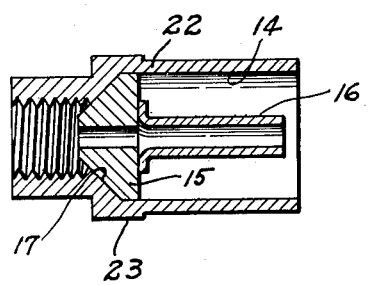
Fig. 3 is a longitudinal, medial, sectional view of a hose coupling in which a standpipe is welded to a body insert, showing the arrangement of parts prior to assembly of the coupling with a hose and securement thereto.
Figure 4:
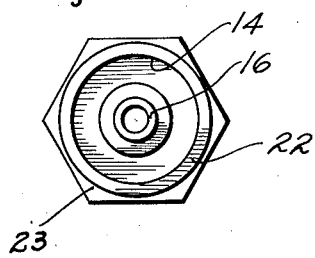
Fig. 4 is an end view of the apparatus of Fig. 3, showing the arrangement of parts prior to securement of the body insert in the tubular member.
Figure 5:
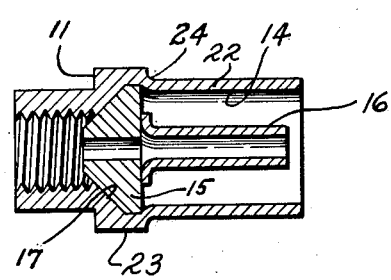
Fig. 5 is a view corresponding to Fig. 3, showing the form of the coupling upon completion.
Figure 6:
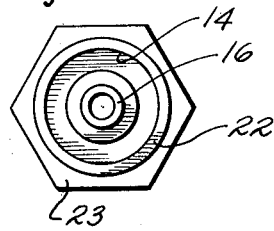
Fig. 6 is an end view of the apparatus of Fig. 5.

As illustrated in Figs. 1 and 2, the standpipe 16 is shown as integral with the body insert 15; however, the invention is not limited thereto; and if desired, as illustrated in Figs. 1 and 5, the standpipe 16 may be welded, brazed or otherwise secured, preferably by some fusion process to the body insert 15. Furthermore, my invention is not limited to the use of a truncated-conical washer for deforming the tubular member to secure the body insert 15. For example, if desired, a tubular blank 22, as shown in Fig. 3, may be provided which is formed with a hexagonal rib or center portion 23 serving as a wrench-engaging or nut portion. In order to secure the body insert 15 in position against the seat 17, the right-hand or hose-engaging portion 14 of the blank 22 is contracted or swaged (after a hose has been inserted between the portion 14 and the standpipe 16) so as to produce the formation illustrated in Fig. 5 in which the body insert 15 is secured between the seat 17 and the swaged shoulder 24.

Figure 7:
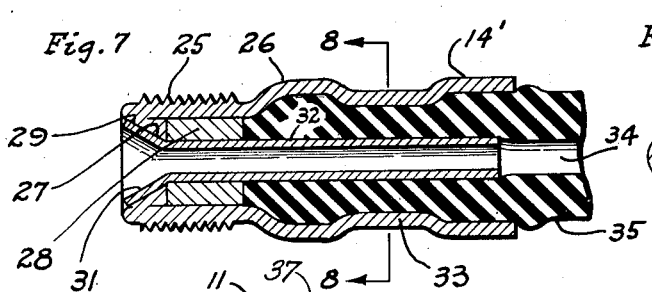
Fig. 7 is a longitudinal, medial, sectional view of a hose coupling in which the coupling end is exteriorly threaded instead of internally threaded and showing the position of the hose within the tubular portion of the coupling.

Figs. 1 to 5 are illustrative of an arrangement in which the tubular member 11 is interiorly threaded at one end. It is to be understood, however, that my invention is not limited thereto, for example, if desired as illustrated in Fig. 7, a tubular member may be provided with an external thread 25. In the arrangement illustrated in Fig. 7, a blank 26 is provided which is folded inward at one end to increase the thickness of the tube wall as shown at 27. The inwardly turned portion 27 may extend for the length of the thread 25. Alternatively, if desired, to simplify the operation, a separate internal bushing 28 may be provided. Preferably the end surface of the portion 27 is formed as a conical seat 29 to receive a corresponding flare 31 of a standpipe 32.

Figure 8:
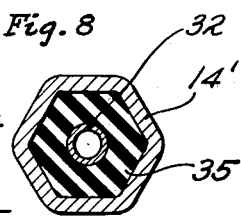
Fig. 8 is a cross-sectional view of the apparatus of Fig. 7, represented as cut by a plane 8—8 and as seen by looking in the direction of the arrows, indicated in Fig. 7.

In the arrangement of Figs. 7 and 8, the hose surrounding portion 14' of the tubular member is formed of sufficient length so that the mid portion 33 may be swaged inwardly to the form of a hexagon, as illustrated in Fig. 8, to form a wrench-engaging portion. It is to be understood that the hexagonal portion 33 is made long enough so as to provide a substantially true hexagon for sufficient length to receive a standard wrench. In assembling the apparatus illustrated in Fig. 7, the standpipe 32 is inserted into the bore 34 of a hose 35 after the tubular portion 14' has been slipped over the end of a hose 35 and the flare 31 is brought into abutment with the conical seat 29. The portion 33 of the tubular member is then swaged or compressed into the hexagonal shape thereby compressing the hose 35 so as to secure the standpipe 32 within the hose end to hold the flare 31 in the fluid-tight contact with the seat 29.

Figure 9:
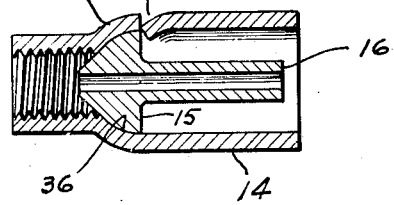
Fig. 9 is a longitudinal, medial, sectional view of a hose coupling in which the body insert is secured by staking one or more portions of the hose-surrounding tubular member.

Although as illustrated in Figs. 1 to 7, I have shown a conical seat 17 or 29 between the body insert 15 and the tubular member, it is to be understood that my invention is not limited thereto. For example, if desired a spherical, parabolic or other curved seat 36 may be employed as illustrated in Fig. 9. Fig. 9 illustrates also the securement of the body insert 15 within the tubular member 11 by inwardly staking one or more portions 37 of the tubular member around the periphery thereof adjacent the inner surface of the body insert 15.

I have herein shown and particularly described certain embodiments of my invention and certain methods of operation embraced therein for the purpose of explaining its principle of operation and showing its application but it will be obvious to those skilled in the art that many modifications and variations are possible and I aim, therefore, to cover all such modifications and variations as fall within the scope of my invention which is defined in the appended claims.

What I claim is:

1. A hose coupling comprising in combination a generally tubular open ended sleeve member, threaded at one end with a seat at said end, and having a portion at the other end adapted to engage the exterior of a hose, a body insert disposed within the intermediate portion of said sleeve member and in fluid sealing contact with the seat of said sleeve member and a normally truncated washer surrounding the intermediate portion of said sleeve member flattened to crimp said sleeve member to secure said body insert therein.

2. A hose coupling comprising a sleeve member having an internally threaded portion at one end, a portion at the other end adapted to engage the exterior of a hose, and an intermediate conical abutment portion, a body insert disposed within said sleeve member and having a conical nose the radially outer portion of which seals against said conical abutment portion, the radially inner conical portion of said conical nose being an extension of the outer conical portion and formed to seal with a detachable coupling element of the inverted type, and a standpipe projecting from the other end of said insert and extending within the hose engaging portion of said sleeve member and adapted to be disposed within the bore of a hose, said sleeve member being deformed radially inwardly against said other end of the insert before insertion of a hose therein to grip said body insert and press it against the conical abutment of the body to form a fluid-tight seal with the body.

GEORGE H. HUFFERD.

REFERENCES CITED

The following references are of record in the file of this patent:

UNITED STATES PATENTS

| Number | Name | Date |
|---|---|---|
| 1,849,076 | Dick | Mar. 15, 1932 |
| 2,008,650 | Weatherhead | July 16, 1935 |
| 2,017,362 | Werder | Oct. 15, 1935 |
| 2,025,427 | Weatherhead | Dec. 24, 1935 |
| 2,028,316 | Brunner | Jan. 21, 1936 |
| 2,038,217 | Heidloff | Apr. 21, 1936 |
| 2,268,142 | Lusher et al. | Dec. 30, 1941 |
| 2,432,598 | Weatherhead | Mar. 16, 1945 |